United States Patent [19]

Jauch

[11] Patent Number: 4,504,084

[45] Date of Patent: Mar. 12, 1985

[54] DOCUMENTS CONTAINING INFORMATION INVISIBLE TO THE NAKED EYE

[75] Inventor: Karl Jauch, Le Lignon, Switzerland

[73] Assignee: Sodeco-Saia AG, Geneva, Switzerland

[21] Appl. No.: 575,377

[22] Filed: Jan. 30, 1984

Related U.S. Application Data

[63] Continuation of Ser. No. 80,142, Sep. 28, 1979, abandoned, which is a continuation of Ser. No. 844,284, Oct. 21, 1977, abandoned.

[30] Foreign Application Priority Data

Oct. 28, 1976 [CH] Switzerland ............... 13592/76

[51] Int. Cl.$^3$ ............................................... B42D 15/00
[52] U.S. Cl. ................................. 283/94; 283/91; 283/901; 283/17
[58] Field of Search ............... 235/480, 484; 283/87, 283/88, 89, 90, 91, 94, 901, 904, 17

[56] References Cited

U.S. PATENT DOCUMENTS

| | | | |
|---|---|---|---|
| 3,640,009 | 2/1972 | Komiyama | 40/2.2 |
| 3,679,449 | 7/1972 | Nagot et al. | 283/89 X |
| 3,919,447 | 11/1975 | Kilmer, Jr. et al. | 428/138 |
| 3,973,788 | 8/1976 | Pekko et al. | 282/19 R |
| 4,014,602 | 3/1977 | Ruell | 350/3.5 |
| 4,017,834 | 4/1977 | Cuttill et al. | 340/149 |
| 4,098,940 | 7/1978 | Groh et al. | 428/218 |
| 4,118,122 | 10/1978 | Rees et al. | 283/6 X |
| 4,119,361 | 10/1978 | Greenaway | 350/1.1 |
| 4,140,373 | 2/1979 | Rull | 350/3.77 |
| 4,157,784 | 6/1979 | Gröttrup et al. | 283/89 X |

FOREIGN PATENT DOCUMENTS

| | | |
|---|---|---|
| 2347836 | 1/1977 | Fed. Rep. of Germany . |
| 287332 | 11/1952 | Switzerland . |
| 463332 | 11/1968 | Switzerland . |

*Primary Examiner*—Paul A. Bell
*Attorney, Agent, or Firm*—Morgan, Finnegan, Pine, Foley & Lee

[57] ABSTRACT

A document is disclosed, which contains information invisible to the naked eye, but which information can be made visible by a simple method. Said information is represented by markings on the document, which markings comprise a first color at least partially opaque to at least part of the invisible light spectrum, and a second color which serves to conceal said first color in the visible spectrum, but which second color is itself transparent to said part of the invisible light spectrum.

4 Claims, No Drawings

DOCUMENTS CONTAINING INFORMATION INVISIBLE TO THE NAKED EYE

This is a continuation of application Ser. No. 80,142 filed Sept. 28, 1979, now abandoned which, in turn, is a continuation of application Ser. No. 844,284 filed Oct. 21, 1977, now abandoned.

BACKGROUND OF THE INVENTION

Field of the Invention

This invention refers to documents, and particularly to vital documents, contaning a marking which is not visible to the naked eye and which contains information.

BRIEF DESCRIPTION OF THE INVENTION

In this instance, the term "vital documents" refers to bank notes, securities, credit cards, transportation tickets, identification cards, admission tickets, and the like. The high level of modern counterfeiting techniques makes it possible to imitate and to counterfeit such important papers. To prevent this or make it more difficult, vital documents are equipped with, for example, invisible markings that make it possible to test authenticity, using equipment that is for the most part expensive and complicated. The invisible marking is made with, for example, electrical, magnetic, and optical methods. In the optical realm, markings are known (DT-OS 2, 347, 836) that are made with two printing inks, which produce a clearly recognizable metamerism effect; that is, they look different under different illumination.

The purpose of this invention is to create a vital document fully protected from counterfeiting, the identifying information of which is not visible to the naked eye but can be made visible by a simple method.

The task is solved by the characteristics set forth in claim 1. Advantageous additional developments are defined in the remaining claims.

DETAILED DESCRIPTION OF THE INVENTION

The vital documents pursuant to the invention, completely protected from counterfeiting, are described below in greater detail, with the help of two examples.

FIRST EXAMPLE

A vital document according to the first example contains or consists of an information support equipped with a "dye" that looks black in the range of the visible spectrum of wavelengths 400 to 700 nm, yet is transparent for infrared rays in wavelengths 700 to 1000 nm. The black color can be made, for example, by overprinting with three colors, such as cyan, magenta red, and yellow, or through a mixture of dyes whose absorption range covers the entire visible range. However, any other "dye" that is black in the visible spectral region and transparent for infrared rays can be utilized. On the first black layer of color made according to the manner described, an information-bearing marking is positioned using a black color, e.g., printer's black, which is transparent in varying degrees for infrared rays. The marking can be made in the form of a binary coding, in which the areas printed with the color last mentioned correspond to one binary configuration and the unprinted areas to the other binary configuration. For coding the information, a different degree of transparency or opacity can be used for infrared rays, in which the code is constituted by a series of areas with varying levels of transparency for infrared rays. The marking made in this way on the black supporting surface is invisible, since it is completely concealed by the black visible color. The marking that is transparent in varying degrees under infrared rays of wavelengths 700 to 1000 nm can therefore not be recognized with the naked eye, but only with the help of appropriate methods, for example, transmitting and receiving diodes for infrared rays, an infrared image converter, or similar equipment. The marking can be made first of all by covering it with the black color that is transparent to infrared rays. The information support of the vital paper can be transparent or non-transparent for infrared rays, depending on whether the irradiation method or the reflection method is used in making the marking visible.

SECOND EXAMPLE

In a vital document according to the second example, the black color or color mixture transparent under infrared rays is mixed with a color that is non-transparent in varying degrees for these rays, e.g., printing black, in a variable ratio, so that various mixtures are created. The marking bearing the information is made, for example, by the printing method using mixtures having varying mixture ratios, in which the mixture ratio, that is, the degree or level of transparency for infrared rays of wavelengths of 700 to 1000 nm, is used for coding the information.

In using colors that seem black and that, for other wavelengths outside the visible spectrum, are transparent, partially transparent, and non-transparent, the marking can be made visible using other rays that are not visible with the naked eye, e.g., ultra-violet rays, X-rays, and similar rays.

The vital documents described contain information identifying them, the contents of which cannot be discovered by the naked eye, as the observer sees only a black patch. The information is coded, so that unless one knows the code any information uncovered is difficult to counterfeit. The degree of security of the vital document described against counterfeiting is further increased by the fact that it is difficult to measure and imitate the level of transparency for the rays used. The marking can be simply made by the printing method.

What is claimed is:

1. A document containing information not visible to the naked eye comprising:
   an information support having an information-containing marking on said support, said marking being comprised of a first color which is printer's black, said first color being at least partially opaque for light in at least a portion of an invisible light spectrum consisting of the infrared light spectrum, and a second color consisting of a mixture of colors, the absorption ranges of which cover the entire visible light spectrum, said second color concealing said first color in the visible light spectrum, but being transparent to light in said infrared light spectrum, said information-containing marking being comprised of a variable mixture of said first and second colors, said mixture being variable in order to produce a marking of desired opacity to said infrared light spectrum.

2. A document as recited in claim 1 wherein said information-containing marking is in coded form, said code corresponding to the degree of opacity of said information-containing marking to said infrared light spectrum.

3. A document containing information thereon which is not visible to the naked dye, but which can be rendered visible by light outside of the visible spectrum comprising:

an information support;

an information-containing marking printed on said information support, said information-containing marking being at least partially opaque in the non-visible light spectrum and appearing to be black in the visible light spectrum; and a concealing layer printed on said information support, said concealing layer also appearing to be black in the visible spectrum to thereby conceal said information-containing marking in visible light, and being more transparent to light in the non-visible light spectrum than said information-containing marking;

said information-containing marking including markings of different degrees of opaqueness relative to said concealing layer in non-visible light and being substantially made up of printer's black;

said concealing layer being printed with ink that is a mixture of different colored inks that, collectively, cover the visible spectrum.

4. A document as recited in claim 3 wherein said concealing layer is printed on the document as a background layer and said information-containing layer is printed over said concealing layer whereby said background layer tends to disappear in non-visible light to expose the information in the information-containing marking.

* * * * *

UNITED STATES PATENT AND TRADEMARK OFFICE
CERTIFICATE OF CORRECTION

PATENT NO. : 4,504,084
DATED : March 12, 1985
INVENTOR(S) : Karl Jauch

It is certified that error appears in the above-identified patent and that said Letters Patent is hereby corrected as shown below:

In column 3, Claim 3, line 5, "dye" should read -- eye --.

Signed and Sealed this

Twenty-second Day of October 1985

[SEAL]

Attest:

DONALD J. QUIGG

Attesting Officer

Commissioner of Patents and Trademarks—Designate